(12) United States Patent
West et al.

(10) Patent No.: US 7,737,945 B2
(45) Date of Patent: Jun. 15, 2010

(54) POINTING DEVICE WITH MOVEABLE MAGNETIC DISC AND METHOD

(75) Inventors: Jennifer D. West, Cary, NC (US); Thomas Snyder, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 858 days.

(21) Appl. No.: 11/460,868

(22) Filed: Jul. 28, 2006

(65) Prior Publication Data

US 2008/0024464 A1    Jan. 31, 2008

(51) Int. Cl.
*G06F 3/033* (2006.01)
*G09G 5/00* (2006.01)

(52) U.S. Cl. .................. 345/157; 345/184; 345/161; 324/207.11; 463/37

(58) Field of Classification Search .......... 345/156, 345/157, 184
See application file for complete search history.

(56) References Cited

U.S. PATENT DOCUMENTS

| | | | |
|---|---|---|---|
| 5,432,530 A | 7/1995 | Arita et al. | |
| 5,714,980 A | 2/1998 | Niino | |
| 6,266,046 B1 | 7/2001 | Arita | |
| 6,528,740 B2 | 3/2003 | Miyoshi | |
| 6,583,784 B1 | 6/2003 | Helmbrecht | |
| 6,667,733 B2 | 12/2003 | Miyoshi | |
| 6,831,629 B2 | 12/2004 | Nishino et al. | |
| 6,952,197 B1 | 10/2005 | Nakamura et al. | |
| 7,034,804 B2 | 4/2006 | Lai et al. | |
| 2001/0055002 A1* | 12/2001 | Endo | 345/156 |
| 2002/0093328 A1* | 7/2002 | Maatta et al. | 324/207.11 |
| 2004/0080491 A1* | 4/2004 | Takatsuka et al. | 345/156 |
| 2005/0077165 A1 | 4/2005 | Akieda et al. | |

FOREIGN PATENT DOCUMENTS

| | | |
|---|---|---|
| EP | 1168234 | 1/2002 |
| EP | 11223541 | 7/2002 |
| EP | 1380927 | 1/2004 |
| EP | 1586983 | 10/2005 |

OTHER PUBLICATIONS

International Preliminary Report on Patentability from corresponding International Application No. PCT/US07/01829.
International Search Report and Written Opinion from corresponding International Application No. PCT/US07/01829.

* cited by examiner

*Primary Examiner*—Alexander Eisen
*Assistant Examiner*—Matthew Yeung
(74) *Attorney, Agent, or Firm*—Renner, Otto, Boisselle & Sklar, LLP

(57) ABSTRACT

Disclosed is a pointing device for facilitating user interaction with an electronic device. The pointing device includes a magnetic disc, a magnetic field over which the magnetic disc laterally travels in response to force applied by a user, and a plurality of sensors to detect the location of the magnetic disc relative to the magnetic field.

16 Claims, 3 Drawing Sheets

POINTING DEVICE WITH MOVEABLE MAGNETIC DISC AND METHOD

TECHNICAL FIELD OF THE INVENTION

The present invention relates generally to a user input device for electronic equipment, such as electronic equipment for engaging in voice communications. More particularly, the invention relates to a pointing device having a moveable magnet disc.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. To name a few examples, many electronic devices have cameras, text messaging capability, Internet browsing capability, electronic mail capability, video playback capability, audio playback capability, image display capability and hands-free headset interfaces.

Pointing devices may be used to interact with electronic devices. Common conventional pointing devices include mice, track balls, touchpads and joysticks. For portable devices, multi-way navigation switches (e.g., a collection of switches to provide inputs for up, down, left and right, and sometimes a center select switch) have become popular.

Game players prefer pointing devices with an "analog" feel, such as mice and joysticks, so that movement in any direction in an X-Y field may be input to the electronic device rather than fixed directions established by multi-way navigation switches. However, mice and joysticks are often impractical for portable devices. Joystick-style pointing devices have been incorporated into mobile devices, but usually are embodied as a mechanical lever that contacts a limited number (e.g., four or five) dome switches for a limited number of actual inputs. Also, joysticks for mobile devices tend to be small relative to user's fingers and do not have a physical transition distance that most users would expect for a gaming experience. Moreover, joysticks include a projecting member that may not be desirable on a portable device due to an increased risk of damage and inconvenience to the user when attempting to place the device in a pocket, handbag or the like. Touchpads do not have a projecting member and allow for an analog type of input. However, touchpads are difficult to use in conjunction with games and do not provide the user with a tactile sensation.

SUMMARY

In view of the above-mentioned shortcomings associated with conventional pointing devices for portable electronic devices, there is a need in the art for an improved pointing device and a method of user interaction with an electronic device.

According to one aspect of the invention, a pointing device includes a magnetic disc; a magnetic field over which the magnetic disc laterally travels in response to force applied by a user; and a plurality of sensors to detect the location of the magnetic disc relative to the magnetic field.

According to one embodiment of the pointing device, the sensors detect a change in the magnetic field.

According to one embodiment of the pointing device, the sensors are Hall effect sensors.

According to one embodiment of the pointing device, output signals from the sensors are processed to determine disc travel speed and duration of displacement.

According to one embodiment of the pointing device, the magnetic field is induced.

According to one embodiment of the pointing device, the magnetic field includes a magnetic field portion that is polarized with the same polarity as a side of the magnetic disc that is adjacent the magnetic field to apply a levitating force on the magnetic disc when the magnetic disc is disposed over the magnetic field portion.

According to one embodiment of the pointing device, the magnetic field includes a central attraction zone to position the magnetic disc with respect to the magnetic field in the absence of force applied by the user.

According to one embodiment of the pointing device, the attraction zone is defined by a magnetic field portion of neutral magnetic polarity.

According to one embodiment of the pointing device, the attraction zone is defined by a magnetic field portion that has opposite polarity as the side of the magnetic disc that is adjacent the magnetic field.

According to one embodiment of the pointing device, the magnetic field includes a gradient such that a peripheral area of the magnetic field portion has a stronger magnetic field than a central area of the magnetic field portion.

According to one embodiment, the pointing device further includes a member attached to the magnetic disc that moves with the magnetic disc relative to a housing.

According to one embodiment of the pointing device, the member and the housing cooperate to limit vertical movement of the magnetic disc.

According to one embodiment of the pointing device, the member and the housing cooperate to limit lateral movement of the magnetic disc.

According to one embodiment of the pointing device, the magnetic field is controllable to lock the position of the magnetic disk According to another aspect of the invention, an electronic device includes a processor for executing a software application; and a pointing device for providing directional user input commands to the application. The pointing device includes a magnetic disc; a magnetic field over which the magnetic disc laterally travels in response to force applied by a user; and a plurality of sensors to detect the location of the magnetic disc relative to the magnetic field.

According to one embodiment of the electronic device, the electronic device is a mobile radio terminal.

According to one embodiment of the electronic device, the magnetic field includes a magnetic field portion that is polarized with the same polarity as a side of the magnetic disc that is adjacent the magnetic field to apply a levitating force on the magnetic disc when the magnetic disc is disposed over the magnetic field portion.

According to one embodiment of the electronic device, the magnetic field includes a central attraction zone to position the magnetic disc with respect to the magnetic field in the absence of force applied by the user.

According to another aspect of the invention, a method of interfacing with an electronic device includes inducing a magnetic field under a magnetic disc; sensing changes in the magnetic field resulting from lateral movement of the magnetic disc with respect to the magnetic field; and generating command signals indicative of the movement of the magnetic disc from the sensed changes in magnetic field.

According to one embodiment, the method further includes attracting the magnetic disc to a central attraction zone of the magnetic field in the absence of force applied on the magnetic disc by a user.

According to one embodiment of the method, the magnetic field includes a magnetic field portion that is polarized with the same polarity as a side of the magnetic disc that is adjacent the magnetic field to apply a levitating force on the magnetic disc when the magnetic disc is disposed over the magnetic field portion.

According to one embodiment, the method further includes controlling the magnetic field to lock the position of the magnetic disc.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
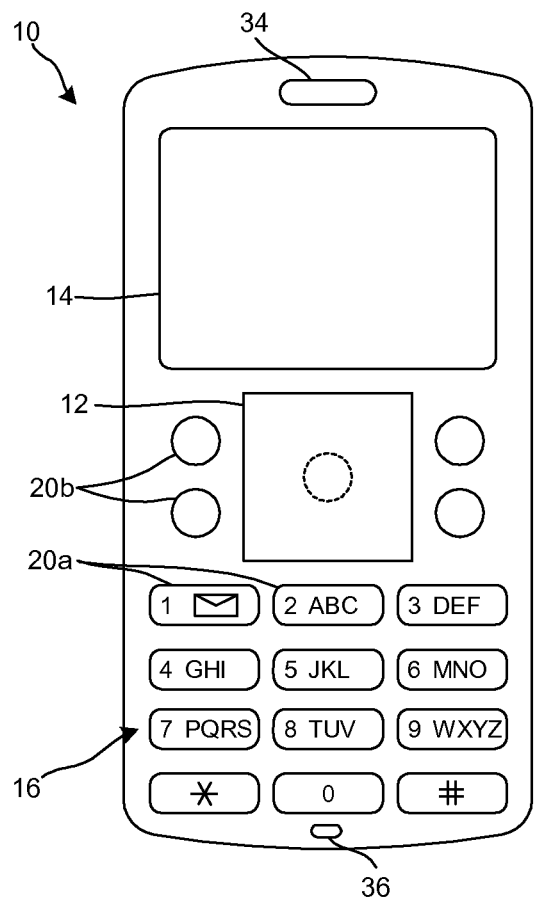
FIG. 1 is a schematic view of a mobile telephone as an exemplary electronic equipment in accordance with an embodiment of the present invention.

The present invention will now be described with reference to the drawings, wherein like reference numerals are used to refer to like elements throughout. It will be understood that the figures are not necessarily to scale.

The terms "electronic equipment" and "electronic device" include portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment, examples of which include a media player, a gaming device and a computer. Aspects of the invention are directed to a pointing device for an electronic device. The pointing device may be integrated with the electronic device or constructed as a self-contained and independent (e.g., stand-alone) input device that interfaces with the electronic device via a wired or wireless interface.

Figure 2:
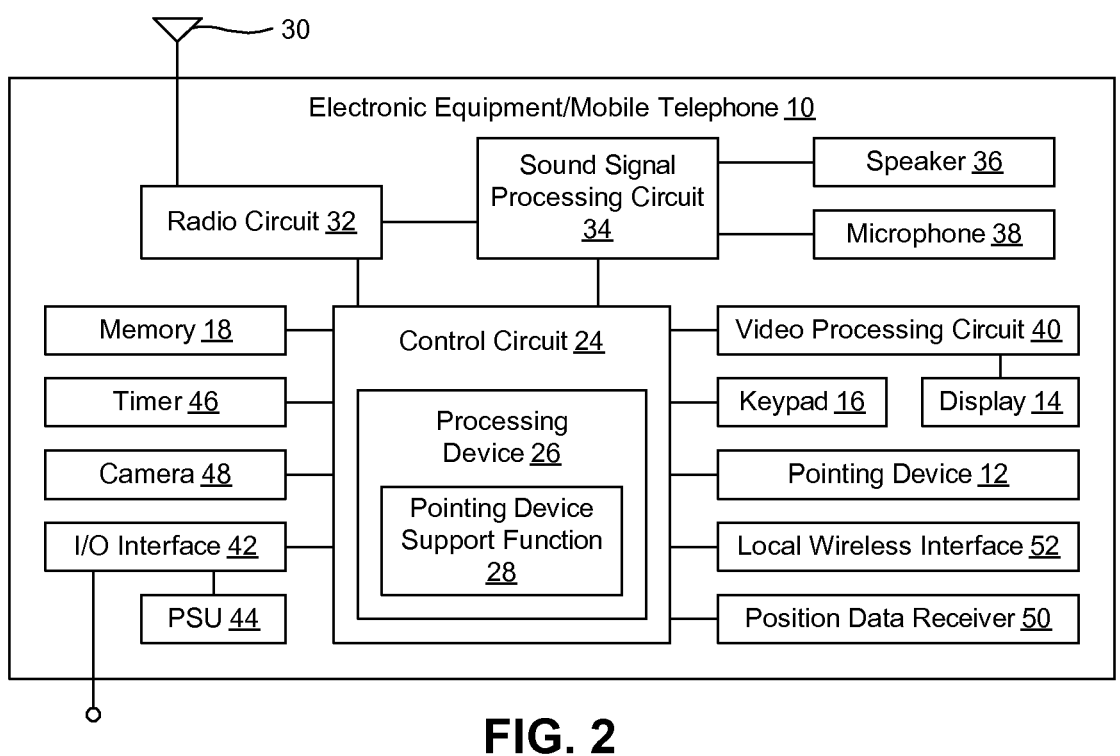
FIG. 2 is a schematic block diagram of the relevant portions of the mobile telephone of FIG. 1 in accordance with an embodiment of the present invention.

Referring initially to FIGS. 1 and 2, an electronic equipment is shown. The electronic equipment 10 includes a pointing device 12 that is configured to act as a user input device. The construction and operation of the pointing device 12 will be described in greater detail below. It will be appreciated that the pointing device 12 may include or operate in conjunction with any appropriate software drivers and/or hardware controllers, including, for example, executable code that may be resident in and executed by the electronic equipment 10.

The electronic equipment of the illustrated embodiment is a mobile telephone and will be referred to as the mobile telephone 10. The mobile telephone 10 is shown as having a "brick" or "block" form factor housing, but it will be appreciated that other type housings, such as a clamshell housing or a slide-type housing, may be utilized.

The mobile telephone 10 includes a display 14 and keypad 16. The display 14 displays information to a user such as operating state, time, telephone numbers, contact information, various navigational menus, etc., which enable the user to utilize the various features of the mobile telephone 10. The display 14 also may be used to visually display content received by the mobile telephone 10 and/or retrieved from a memory 18 of the mobile telephone 10. The display may be used to present images, video and other graphics to the user, such as photographs, mobile television content and video associated with games.

The keypad 16 provides for a variety of user input operations. For example, the keypad 16 typically includes alphanumeric keys 20a for allowing entry of alphanumeric information such as telephone numbers, phone lists, contact information, notes, etc. In addition, the keypad 16 typically includes special function keys 20b such as a "call send" key for initiating or answering a call, and a "call end" key for ending or "hanging up" a call. Special function keys may also include menu navigation and select keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc.

FIG. 2 represents a functional block diagram of the mobile telephone 10. For the sake of brevity, generally conventional features of the mobile telephone 10 will not be described in great detail herein. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out operation of the mobile telephone 10. The memory 18 may be, for example, one or more of a buffer, a flash memory, a hard drive, a removable media, a volatile memory, a non-volatile memory or other suitable device.

In addition, the processing device 26 may execute code that supports or interacts with the pointing device 12. For example, a pointing device driver or pointing device support function 28 may be executed by the processing device 26 to convert signals generated by the pointing device 12 into commands for other programs executed by the processing device 26 or elsewhere in the mobile telephone 10. The pointing device support function 28 may be embodied, for example, as a program stored on a computer or machine-readable medium. It will be apparent to a person having ordinary skill in the art of computer programming, and specifically in application programming for mobile telephones or other electronic devices, how to program a mobile telephone 10 to operate and carry out logical functions associated with interfacing to the pointing device 12. Accordingly, details as to specific programming code have been left out for the sake of brevity. Also, while the pointing device support function 28 is executed by the processing device 26 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 30 coupled to a radio circuit 32. The radio circuit 32 includes a radio frequency transmitter and receiver for transmitting and receiving signals via the antenna 30 as is conventional. The radio circuit 32 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, MBMS, WiFi, WiMax, DVB-H, ISDB-T, etc as well as advanced versions of these standards.

The mobile telephone 10 further includes a sound signal processing circuit 34 for processing audio signals transmitted by/received from the radio circuit 32. Coupled to the sound processing circuit 34 are a speaker 36 and a microphone 38 that enable a user to listen and speak via the mobile telephone 10 as is conventional. The radio circuit 32 and sound processing circuit 34 are each coupled to the control circuit 24 so as to carry out overall operation. Audio data may be passed from the control circuit 24 to the sound signal processing circuit 34 for playback to the user. The audio data may include, for example, audio data from an audio file stored by the memory 18 and retrieved by the control circuit 24. The sound processing circuit 32 may include any appropriate buffers, decoders, amplifiers and so forth.

The mobile telephone 10 also includes the aforementioned pointing device 12, display 14 and keypad 16 coupled to the control circuit 24. The display 14 may be coupled to the control circuit 24 by a video processing circuit 40 that converts video data to a video signal used to drive the display 14. The video processing circuit 40 may include any appropriate buffers, decoders, video data signal processors and so forth. The video data may be generated by the control circuit 24, retrieved from a video file that is stored in the memory 18, derived from an incoming video data stream received by the radio circuit 32 or obtained by any other suitable method.

The mobile telephone 10 further includes one or more I/O interface(s) 42. The I/O interface(s) 42 may be in the form of typical mobile telephone I/O interfaces and may include one or more electrical connectors. As is typical, the I/O interface (s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown), such as a headset (sometimes referred to as an earset) that audibly emits sounds in accordance with signals output by the sound processing circuit 34. Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the headset), another mobile radio terminal, a computer or another device.

The mobile telephone 10 may be configured to transmit, receive and process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth. The mobile telephone 10 may be configured to allow the user to play interactive games or other applications that receive user input from the pointing device 12.

Figure 3:
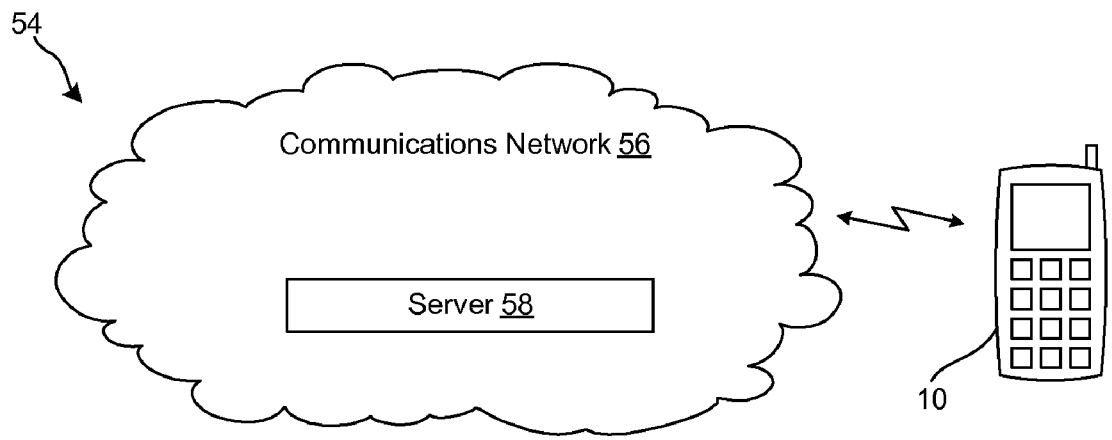
FIG. 3 is a schematic diagram of a communications system in which the mobile telephone of FIG. 1 may operate.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server 58 communicates with the mobile telephone 10 via a transmission medium. The transmission medium may be any appropriate device or assembly, including, for example, a communications tower (e.g., cell tower), another mobile telephone, a wireless access point, a satellite, etc. Portions of the network may include wireless transmission pathways. The network 56 may support the communications activity of multiple mobile telephones 10 and other types of end user devices. As will be appreciated, the server 58 may be configured as a typical computer system used to carry out server functions and may include a processor configured to execute software containing logical instructions that embody the functions of the server 58.

Figure 4:
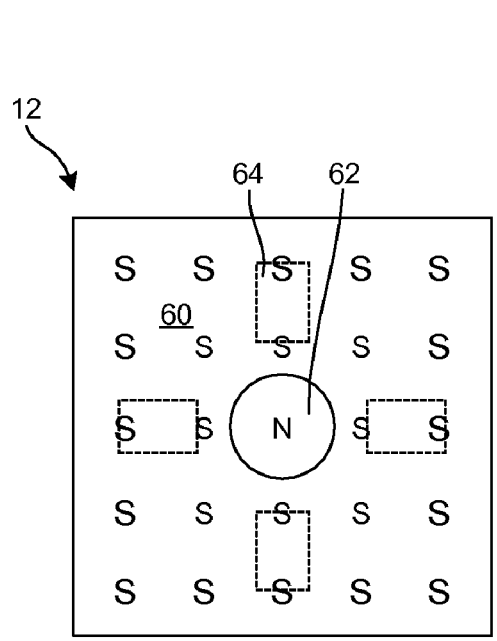
FIG. 4 is a schematic view in an X-Y plane of the operable components of an exemplary pointing device.

Referring now to FIG. 4, schematically shown are operable components of an exemplary embodiment of the pointing device 12. The view of FIG. 4 shows the pointing device in an X-Y plane from a position located above a magnetic field 60. The pointing device 12 includes the magnetic field 60 and a magnetic disc 62, as well as sensors 64 for determining the relative position of the disc 62. The sensors 64 may generate electrical signals that are input to a pointing device control circuit (not shown). In turn, the pointing device control circuit converts the signals from the sensors 64 to a signal indicative of disc 62 movement that may be input to the control circuit 24 as commands for an application executed by the processing device 26. In another embodiment, preprocessed or raw signals output by the sensors 64 may be input to the control circuit 24 for processing by the pointing device support function 28.

Figure 5A:
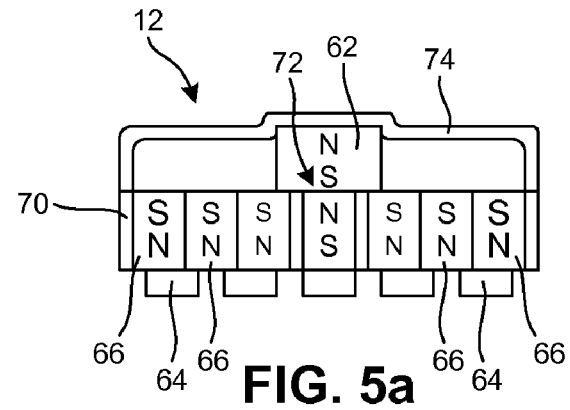
FIGS. 5a and 5b are schematic views in an X-Z plane of the operable components of the pointing device of FIG. 4.
Figure 5B:
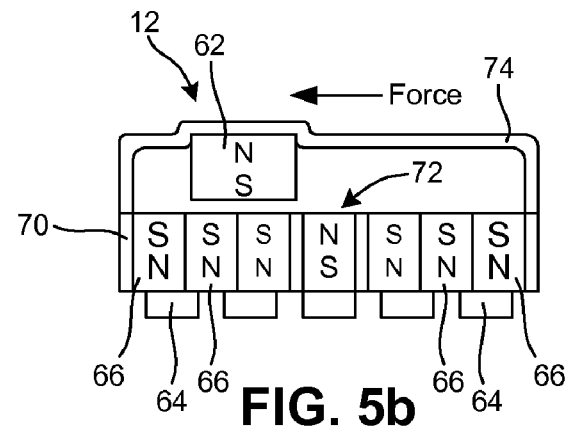

FIGS. 5a and 5b schematically show the pointing device 12 of FIG. 4 from an X-Z plane. FIG. 5a shows the pointing device 12 when the disc 62 is in a home position (or rest position), and FIG. 5b shows the pointing device 12 when the disc 62 is displaced from the home position by a lateral force applied by the user.

The disc 62 may be a permanent magnet. In the illustrated embodiment, a north pole of the disc 62 faces upward and a south pole faces downward. It will be appreciated that the orientation of the poles of the disc 62 may be reversed, in which case relative polarity of the magnetic field 60 (described below) also may be reversed. While the disc 62 is illustrated as being round, the disc 62 may have any suitable shape, such as a square or a rectangle.

In one embodiment, the magnetic field 60 may be made from an arrangement of permanent magnets. In a preferred embodiment, however, the magnetic field 60 is induced. Inducing of the magnetic field may be accomplished in any suitable manner. For instance, a plurality of magnetic field inducers 66 may be arranged as part of a substrate 70. For example, the substrate 70 may be a circuit board 70 on which the inducers 66 are mounted. Filler material may be used to form a planar surface over which the disc 62 may move. The inducers 66 may be made from wire-wrapped iron rods that magnetically polarize when current is passed through the wires.

A central portion of the magnetic field 60 may have neutral magnetic polarity, or may be polarized with opposite polarity from the bottom side of the disc 62, so that the central portion of the magnetic field 60 defines an attraction zone 72 for the disc 62. If polarized, the central portion of the magnetic field 60 may have opposite polarity from the remainder of the magnetic field 60. In the illustrated example, the central portion of the magnetic field 60 has a north pole to attract the south pole of the disc 62. The disc 62 may be drawn to the attraction zone 72 to center the disc 62 with respect to the magnetic field 60 when the disc 62 is not moved by the user and to retain the disc 62 against the substrate 70. The attraction between the disc and the attraction zone 72 may be fairly weak so the user may move the disc 72 from the attraction zone 72 with relative ease and without the creation of a "jerky" input motion detectable by the pointing device 12.

The magnetic field 60 surrounding the area of the attraction zone 72 may have the same magnetic polarity as the bottom side of the disc 62. When lateral force is applied to the disc 62, the disc 62 may become dislodged from the attraction zone 72 and laterally move over the magnetic field 60. The disc 72 may be repelled by the commonly polarized bottom side of the disc 62 and magnetic field 60. If the user applies only a small amount of downward force on the disc 72, such repulsion may cause the disc 62 to levitate slightly over the magnetic field 60.

A flexible membrane 74 may be placed over the disc 62. The membrane 74 may be arranged to enclose the magnetic field 60, but allow lateral travel of the disc 62 over the magnetic field 60 and slight vertical separation of the disc 62 from the surface of the substrate 70. The membrane 74 may serve to retain the disc 62 from "flipping" over during use and from accidental loss. The membrane also may keep the disc 62 and magnetic field 60 free from dust and debris. The membrane 74 may be implemented with a piece of rubber that allows the user to feel the disc 62 under the membrane 74 while manipulating the disc 62 by pushing on the membrane 74. As such, the membrane 74 may provide a low retention strength against the disc 62 to allow lateral movement of disc 62 as well as some vertical movement of the disc 62. Also, the membrane 74 may provide a low frictional surface to allow the user's fingers to move easily over the membrane 74. The membrane 74 may be printed on an upper surface to present visual markings and/or indicia to the user.

The magnetic field 60 may be imparted with a gradient to assist in drawing the disc 62 back to a neutral position (e.g., the attraction zone 72) after lateral displacement. For instance, the magnetic force may be stronger in peripheral regions of the magnetic field 60 relative to regions of the same polarity, but that are located adjacent the attraction zone 72. The gradient is graphically shown in the figures with north and south pole character designations ("S" and "N") shown in varying typeface size where larger typeface indicates a stronger localized field. The attraction zone 72 and/or the gradient establishes a magnetic biasing between the disc 62 and the magnetic field 60 to move the disc 62 to the home position when not in use.

As indicated, sensors 64 may be used to determine the relative location of the disc 62. In one embodiment, the sensors 64 may be Hall effect sensors arranged to detect movement of the disc 62 by sensing variations in the magnetic field 60 caused by the localized presence or absence of the disc 62. The number and locations of sensors may depend on a desired level of input resolution. In the view of FIG. 4, four sensors are shown under the substrate 70 used to generate the magnetic field 60. The sensors 60 are arranged along compass-style directions (e.g., north, south, east, and west) and may be collectively used to detect the location of the disc 62. The location of the disc 62 may be sampled over time to ascertain the direction and speed of disc 62 travel. In the view of FIGS. 5a and 5b, an array of sensors is shown under the substrate 70. Hall effect sensors are transducers that have an output voltage that varies in response to magnetic field density. By analyzing the outputs of plural sensors with a pointing device control circuit (not shown) and/or the pointing device support function 28, the location of the disc 62, the speed of disc 62 offset and the duration of disc 62 offset may be converted into control signals for various applications executed by the mobile telephone 10.

Figure 6:
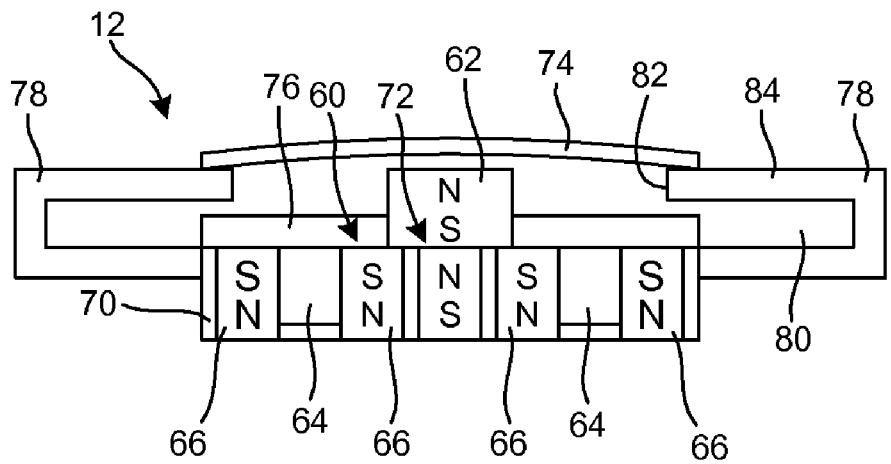
FIG. 6 is a schematic view in an X-Z plane of the operable components of another exemplary pointing device.

The control signals generated from the sensor 64 output signals may be adapted for specific applications. For example, many legacy mobile telephone 10 applications may be coded to receive pointing device inputs corresponding to four to eight discrete compass-style directions. Such directions may be suitable for some rudimentary games and for menu navigation schemes. A higher degree of direction resolution and/or speed and duration information may be used to control more sophisticated applications, including game applications, while providing the user with an "analog" feel to the pointing device 12 typically experienced from mice and large-handled joysticks With additional reference to FIG. 6, another embodiment of the pointing device 12 is shown from the X-Z plane. The pointing device 12 of FIG. 6 includes the magnetic field 60, the magnetic disc 62, and the sensors 64. The magnetic field 60 is induced by inducers 66 arranged as part of the substrate 70. The sensors 64 also form part of the substrate 70, instead of being located under the substrate 70. For example, the inducers 66 and sensors 64 may be mounted to a circuit board. In some embodiments, a filler material may be used to establish a planar surface over which the disc 62 may travel.

The disc 62 may integrally include or may be mounted in an opening of an annular flange 76. A housing member 78 may include a slot 80 to receive the flange 76. Interaction of the housing member 78 and the flange 76 may limit upward and lateral movement of the disc 62. For instance, an outside diameter of the flange 76 may be larger than an inside diameter of an aperture 82 of an upper arm 84 of the flange 76 to minimize the possibility that the disc 62 with flange 76 will dislodge from the pointing device 12. The upper arm 84 may be spaced above the flange 76 when the disc 62 rests against the upper surface of the substrate 70. The upper arm 84 may act as a vertical movement limit stop for the disc 62. The disc 62 may be manipulated by the user through the aperture 82. The aperture 82 may be covered by a flexible membrane 74 upon which the user may push to manipulate the disk 62.

Figure 7A:
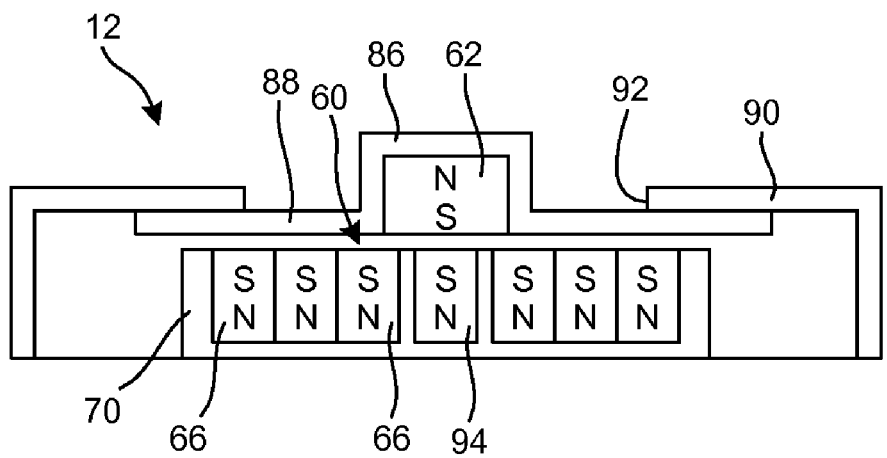
FIGS. 7a and 7b are schematic views in an X-Z plane of the operable components of another exemplary pointing device.

With additional reference to FIG. 7a, another embodiment of the pointing device 12 is shown from the X-Z plane. The pointing device 12 of FIG. 7a includes the magnetic field 60, the magnetic disc 62, and the sensors 64. For simplicity, the sensors 64 are not explicitly shown in the view of FIG. 7a but, as with the other exemplary embodiments, the sensors may arranged with respect to the inducers 66 to detect movement of the disc. Thus, the inducers 66 and/or the sensors 64 may be arranged as part of a substrate 70. In some embodiments, a filler material may be used to establish a planar surface over which the disc 62 may travel.

The disc 62 may be inset into a cap 86. The cap 86 may be formed from a rigid material, such as plastic. The cap 86 may include a flange 88 that is similar to the flange 76 of FIG. 6. The cap 86 may be trapped by a housing member 90. The disc 62 and the cap 86 may move together, but the interaction of the housing member 90 and the cap 86 may limit upward and lateral movement of the disc 62. For instance, an outside diameter of the flange 88 may be larger than an inside diameter of an aperture 92 of the housing member 90 to minimize the possibility that the disc 62 and the cap 86 will dislodge (e.g., "flip-over" or become lost) from the pointing device 12. Upon lateral movement of the disc 62, the housing member 90 may contact a portion of the cap 86 that conforms around the disc 62 to limit travel of the disc 62 and the cap 86 in the X-Y directions. The housing member 90 may be spaced above the flange 76 when the disc 62 rests against the upper surface of the substrate 70. The housing member 90 may act as a vertical movement limit stop for the disc 62. The disc 62 may be manipulated by the user by pushing on the cap 86. A gasket and/or a tail geometry on the flange 88 may be used to inhibit dust ingress into the pointing device 12.

The embodiment of FIG. 7a shows the magnetic field 60 formed by inducers 66 that each have a magnetic polarity that is the same as the polarity of the lower portion of the disc 62 so that when the magnetic field 60 is induced, the disc 62 and cap 86 will have a tendency to float over the magnetic field 60. Alternatively, a center inducer 94 may have opposite polarity as the polarity of the lower portion of the disc 62 to create an attraction zone similar to the attraction zone 72 shown in FIGS. 4 through 6.

Figure 7B:
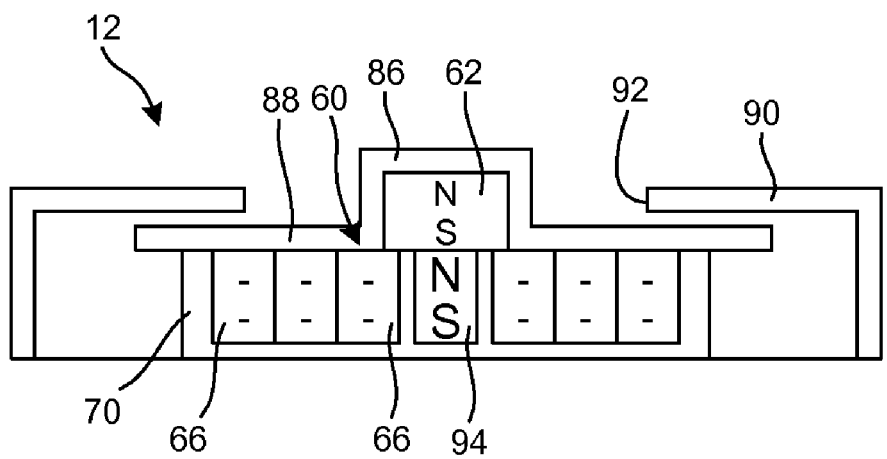

With additional reference to FIG. 7b, the pointing device of FIG. 7a is shown in a locked configuration. The locked configuration adjusts the magnetic field 60 to hold the disc 62 in a fixed location. In the illustrated embodiment, a central inducer 94 is used to invoke a relatively strong magnetic field to attract the disc 62 to the center of the pointing device 12 and secure the disc 62 in that position absent a relatively high amount of force applied to the disc 62. The remaining inducers 66 are turned off in the illustrated embodiment. In other embodiments, all of the inducers 66 and 94 may be used to polarize the entire magnetic field 60 to attract and lock the disc 62. The disc 62 may be locked for certain operational modes of the mobile telephone 10, similar to the way a key lock feature may be used to prohibit the inadvertent pushing of a button to activate functionality in the mobile telephone 10. In a gaming application, the locking feature may be turned on if the user losses a game or losses a character within a game. Locking the disc 62 in this situation may serve as an interactive feedback mechanism to communicate the loss to the user.

As will be appreciated, illustrated and described are various exemplary embodiments of a pointing device that provides a low-profile user input device. Since the illustrated and described embodiments are example implementations the features from one embodiment may be used in the same way or in a similar way in one or more other embodiments and/or in combination with or instead of the features of the other embodiments. The magnetized disc 62 may feel to the user as if it is floating when dislocated from a home position during use. Also, the disc 62 may be drawn back to the home position in the absence of counteracting force applied by the user. The pointing device 12 may improve a user's experience when interfacing with the electronic device controlled by the pointing device 12, especially for controlling applications such as games. Relative to conventional pointing devices for mobile devices, the pointing device 12 improves the user's ability to make complex motions (e.g., move in a north-west or north-east direction) and to move from one position to another (e.g., a south-west location to a north-west location) without traveling through a central neutral zone.

In another embodiment, the magnetic disc 62 may be replaced with a disc having a polarized electric field. In this embodiment, cooperating electric fields may replace the magnetic field 60. Detection of changes in the electric field caused by movement of the disc may be translated into user input commands. In this embodiment, the electric fields may be established using conductive plates, similar to the plates of a capacitor. Establishing the electric field on the disc may include coupling the disc to a voltage source using a tether (not shown) having electrical conductors.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A pointing device, comprising:
    a magnetic disc;
    a magnetic field over which the magnetic disc laterally travels in two dimensions in a plane that is parallel with respect to a source of the magnetic field in response to force applied by a user; and a plurality of sensors to detect the location of the magnetic disc relative to the magnetic field;

wherein the magnetic field includes a magnetic field portion that is polarized with the same polarity as a side of the magnetic disc that is adjacent to the magnetic field to apply a levitating force on the magnetic disc when the magnetic disc is disposed over the magnetic field portion; and wherein the magnetic field portion surrounds a central attraction zone to position the magnetic disc with respect to the magnetic field in the absence of force applied by the user.

2. The pointing device of claim 1, wherein the sensors detect a change in the magnetic field.

3. The pointing device of claim 2, wherein the sensors are Hall effect sensors.

4. The pointing device of claim 2, wherein output signals from the sensors are processed to determine disc travel speed and duration of displacement.

5. The pointing device of claim 1, wherein the magnetic field is induced.

6. The pointing device of claim 1, wherein the attraction zone is of neutral magnetic polarity.

7. The pointing device of claim 1, wherein the attraction zone is of opposite polarity as the side of the magnetic disc that is adjacent to the magnetic field.

8. The pointing device of claim 1, wherein the magnetic field includes a gradient such that a peripheral area of the magnetic field portion has a stronger magnetic field than a central area of the magnetic field portion.

9. The pointing device of claim 1, further comprising a member attached to the magnetic disc that moves with the magnetic disc relative to a housing.

10. The pointing device of claim 9, wherein the member and the housing cooperate to limit vertical movement of the magnetic disc.

11. The pointing device of claim 9, wherein the member and the housing cooperate to limit lateral movement of the magnetic disc.

12. The pointing device of claim 1, wherein the magnetic field is controlled to lock the position of the magnetic disk.

13. An electronic device, comprising:
a processor for executing a software application; and
a pointing device for providing directional user input commands to the application, the pointing device including:
a magnetic disc;
a magnetic field over which the magnetic disc laterally travels in two dimensions in a plane that is parallel with respect to a source of the magnetic field in response to force applied by a user; and
a plurality of sensors to detect the location of the magnetic disc relative to the magnetic field;
wherein the magnetic field includes a magnetic field portion that is polarized with the same polarity as a side of the magnetic disc that is adjacent to the magnetic field to apply a levitating force on the magnetic disc when the magnetic disc is disposed over the magnetic field portion; and
wherein the magnetic field portion surrounds a central attraction zone to position the magnetic disc with respect to the magnetic field in the absence of force applied by the user.

14. The electronic device of claim 13, wherein the electronic device is a mobile radio terminal.

15. A method of interfacing with an electronic device, comprising:
inducing a magnetic field under a magnetic disc, wherein the magnetic field includes a magnetic field portion that is polarized with the same polarity as a side of the magnetic disc that is adjacent to the magnetic field to apply a levitating force on the magnetic disc when the magnetic disc is disposed over the magnetic field portion, and wherein the magnetic field portion surrounds a central attraction zone to position the magnetic disc with respect to the magnetic field in the absence of force applied by a user;
sensing changes in the magnetic field resulting from lateral movement of the magnetic disc in two dimensions in a plane that is parallel with respect to a source of the magnetic field; and
generating command signals indicative of the movement of the magnetic disc from the sensed changes in magnetic field.

16. The method of claim 15, further comprising controlling the magnetic field to lock the position of the magnetic disc.

* * * * *